United States Patent Office 2,865,709
Patented Dec. 23, 1958

2,865,709

PRODUCTION OF SILICO FLUORIDES

Hans Horn, Evanston, and Robert F. McCullough, Glenview, Ill., assignors to International Minerals & Chemical Corporation, a corporation of New York No Drawing. Application September 12, 1955
Serial No. 533,900

4 Claims. (Cl. 23—88)

This invention relates to the production of fluoride chemicals. More particularly, it relates to the production of insoluble silico fluorides. Still more particularly, it relates to the production of potassium silico fluoride which meets chemical grade specifications for composition, from so-called fertilizers plant waste liquor.

Gases evolved when phosphate rock is reacted with sulfuric acid in amounts to form superphosphates and phosphoric acid contain among other gaseous products silicon tetrafluoride. This gas, upon absorption in water hydrolyzes and the so-called waste liquor formed is a solution containing fluosilicic acid ($H_2SiF_6$). When this solution is mixed with a concentrated brine of a chloride of a cation forming insoluble fluosilicates, for example, sodium chloride or potassium chloride, a reaction yielding an insoluble silico fluoride salt occurs, but the silico fluoride develops in a highly dispersed state as a substantially unfilterable gel. If the brine solution contains a maximum of about 35 grams per liter of potassium chloride, a fine particle size crystalline product varying from 10 to 15 microns in size can be obtained which is easy to separate from the mother liquor and easy to dry.

If the waste liquor is reacted with, for example, solid potassium chloride at a temperature between about 50° C. and about 80° C., a crystalline product is recoverable which has a F/Si mol ratio of approximately 6, but the product averages only between about 92% and about 95% $K_2SiF_6$ and is not completely water soluble.

The failure of the insoluble silico fluoride products to precipitate from waste liquors in relatively pure form has been traced to variation in F/Si mol ratio in the starting liquor. Waste liquors apparently vary in the amount of $SiO_2$ which is colloidally dispersed or actually in solution, but not present in the form of fluosilicic acid. At least a portion of the excess silica precipitates with the silico fluoride salt in a relatively water insoluble form and dilutes out the precipitate, thereby making it impossible to obtain a silico fluoride product meeting purity specifications such that it can be used more advantageously in water purification.

Although the above has been illustrated using potassium silico fluoride, the same effect has been observed when precipitating sodium silicofluoride and the other more insoluble silicofluorides.

It is a primary object of this invention to provide a process for conversion of the fluosilicic acid of waste liquor into crystalline silico fluorides having a purity in excess of 98%.

It is another object of this invention to provide a process wherein solid chloride salts are used as a reactant and chemical grade silico fluorides produced by precipitation.

It is still another object of this invention to provide a continuous process, as well as a cyclical process, for the commercial production of crystalline silico fluorides.

It is still a further object of this invention to provide a process for improving the purity and yield of silico fluorides precipitated from waste liquors.

It is still another object of this invention to provide a process whereby the potassium silico fluoride product can be consistently precipitated in the desired purity.

These and other objects of the invention will be apparent to those skilled in the art from the following description.

The standard procedure for determining the purity of silicofluorides, for example, potassium silicofluoride is to dissolve the dry product in water at a temperature not exceeding 100° C. and titrating the solution with potassium hydroxide to a Brom Thymol Blue endpoint.

Now, it has been discovered that a product showing by analysis a purity in excess of 98% potassium silico fluoride can be produced from waste liquor if the fluorine to silica mol ratio of the liquor is adjusted to have a mol ratio in excess of about 4.4:1 before reaction with potassium chloride. In the case of sodiumsilicofluoride, however, the mol ratio preferably should be above about 4.8. The optimum fluorine to silica ratio appears to vary somewhat depending upon the silicofluoride being precipitated.

In carrying out the process, the crude fluosilicic acid is freed from precipitated silica, which precipitates from crude fluosilicic acid solutions upon standing by decantation of a clear liquor or filtration or equivalent operation. This solution normally varies from about 12% to about 30% $H_2SiF_6$, depending upon the absorption conditions in the recovery operations. In order to be sure that the silicofluoride salt precipitated will have a purity in excess of about 98%, the fluorine to silica mol ratio at the time of reaction should be between about 4.5 and about 8, preferably between about 4.5 and about 6, the ratios above 6 giving reduced recovery. Adjustment of the F/Si mol ratio can be made after analysis to determine the fluorine and silicon content of the solids-free solution or in view of the latitude allowable once the minimum mol ratio has been exceeded, it can be assumed that the F/Si ratio will be about 4 and adjustment made to insure raising the F/Si mol ratio to above 4.5.

Adjustment of the F/Si mol ratio of the fluosilicic acid may be made by altering either the fluorine content or the silicon content of the solution. Adjustment of the fluorine content may be made by adding fluorine-bearing materials to the solution which will not cause precipitation of insoluble fluorine compounds, for example, by adding hydrofluoric acid or ammonium fluoride. With 100 ml. of an approximately 29% $H_2SiF_6$ solution, showing an F/Si mol ratio of approximately 4, about 7.4 grams of hydrofluoric acid solution of 48% concentration of HF are required to raise the F/Si mol ratio to approximately 4.5.

Silicon content is most easily altered by precipitating silica and removing the solids. Fluosilicic acid solution precipitates silica upon adjustment of the pH of the solution toward neutrality. A preferred mode of operation is to split the fluosilicic acid into minor and major portions, a minor portion constituting between about 10% to about 35% by volume of the feed. The minor portion of solution is neutralized using an ammonia reactant such as gaseous ammonia or ammonium hydroxide to a pH in the range between about 5 and about 8. Precipitated material is removed from the neutralized solution by filtration or centrifuging or the like and the neutralized minor portion mixed with the major portion of fluosilicic acid originally split from the feed. Combined portions of fluosilicic acid after this treatment will have a F/Si mol ratio in the range between about 4.5 and about 5.5. After adjustment of the F/Si mol ratio and removal of any solid precipitate where necessary, the solids-free solution containing fluosilicic acid is reacted with a water soluble salt of cations forming insoluble fluosilicates in acid solution such as sodium, potassium, calcium, barium, cesium, chromium, the reaction being between fluosilicic acid and solid salt. These salts may be any one of a number of reactants, for example, potassium salts such as potassium chloride, potassium sulfate, potassium carbonate, potassium nitrate, potassium acetate and similar salts whose anion is water soluble under the reaction conditions employed.

The reaction of fluosilicic acid solution and reactant salt is carried out at a temperature in the range of about 40° C. to about 100° C., preferably in the range between about 55° C. and about 80° C. At these temperatures, the reaction goes to substantial completion in a period of less than about two hours, during which time reactants such as potassium hydroxide, potassium chloride, etc., are added incrementally when using the batch procedure.

The invention will be further understood by reference to the following examples which are given by way of illustration and without any intention that the invention be limited thereto.

EXAMPLE I

Phosphate rock from the Florida pebble phosphate fields was mixed with approximately 53° Bé. sulfuric acid to form superphosphate. Gases evolved at the mixer were passed through aqueous medium until a fluosilicic acid solution was obtained having a specific gravity of approximately 1.3 and by analysis showing approximately 29.4% $H_2SiF_6$ and a F/Si mol ratio of approximately 4:1. This solution was segregated into four equal portions by weight, A, B, C and D.

Portion A was heated to approximately 160° F. To 1,000 parts by weight of portion A was added 349 parts by weight of solid granular KCl over about a 2 hour period, during which time the admixture was gently agitated. The resulting precipitate was filtered out, washed with cold water and dried at approximately 110° C. Dry solid product dissolved in water at a temperature of approximately 75° C. and titrated to the Brom Thymol Blue endpoint with potassium hydroxide showed a calculated purity of about 92.5%. Chemical analysis for fluorine, silicon and potassium showed mol ratios of F/Si of 6.2 and F/K of 2.95.

EXAMPLE II

To 1,000 parts by weight of portion B from Example I was added approximately 58 parts by weight of aqueous solution of hydrofluoric acid (48% HF by weight). The F/Si mol ratio of the mixture was approximately 4.5. The mixture was heated to approximately 160° F. To 1,058 parts by weight of the mixture was added 385 parts by weight of solid granular KCl over about a 2 hour period, during which time the admixture was gently agitated. The resulting precipitate was filtered out, washed with cold water and dried at approximately 110° C. Dry solid product dissolved in water had a temperature of approximately 75° C. and titrated to the Brom Thymol Blue endpoint with potassium hydroxide calculated to a purity of about 98%. Chemical analysis for fluorine, silicon and potassium showed mol ratios of F/Si of 6.17 and F/K of 3.0.

EXAMPLE III

To 1,000 parts by weight of portion C of the above solution prepared in Example I, was added 188 parts by weight of aqueous solution of hydrofluoric acid (48% HF by weight). The F/Si mol ratio of the mixture was approximately 5.5. The mixture was heated to approximately 160° F. To 1,188 parts by weight of the mixture was added 472 parts by weight of solid granular KCl over about a 2 hour period, during which time the admixture was gently agitated. The resulting precipitate was filtered out, washed with cold water and dried at approximately 110° C. Dry solid product dissolved in water had a temperature of approximately 75° C. and titrated to a Brom Thymol Blue endpoint with potassium hydroxide showed a calculated purity of about 99.2%. Chemical analysis for fluorine, silicon and potassium showed mol ratios of F/Si of 6.1 and F/K of 2.95.

EXAMPLE IV 1,145 parts by weight of portion D from Example I was split to give three portions, one of about 650 parts by weight of the solution, a second portion of 65 parts by weight and a third portion of approximately 430 parts by weight of the solution.

The pH of the 650 parts by weight portion of solution was adjusted with ammonium hydroxide (29% $NH_3$) to approximately 6.5. This required approximately 55 parts by weight of ammonium hydroxide (29% $NH_3$). The silica precipitate was filtered from solution and dried at 110° C.

The silica-free neutralized solution was then mixed with the 65 parts by weight of solution diluted to 400 cc. volume with water to give a fluosilicic acid combined solution having a F/Si mol ratio of approximately 4.5.

This mixture was heated to approximately 160° F. To the mixture was added 210 parts by weight of solid granular KCl over about a two hour period, during which time the admixture was gently agitated. The resulting precipitate was filtered out, washed with cold water and dried at approximately 110° C. Dry solid product tested in accordance with the standard procedure showed a purity of approximately 98.5%.

Comparison of the data from Examples I, II, III and IV shows that after the minimum ratio of about 4.4 F/Si has been exceeded, a product is consistently attained using potassium salts giving a purity in excess of 98% which purity was not attainable from crude fluosilicic acid solutions having a F/Si mol ratio less than about 4.4.

EXAMPLE V

A crude fluosilicic acid solution obtained by the absorption of waste gases from the acidification of phosphate rock with sulfuric acid had a specific gravity of approximately 1.2 and by analysis showed a F/Si mol ratio of approximately 4.46:1. This solution was segregated into two portions, E and F.

Portion E was heated to approximately 160° F. To 1,000 parts by weight of portion E was added 185 parts (96% NaCl) by weight of solid granular NaCl over about a two hour period. The resulting precipitate was filtered out, washed with cold water and dried at approximately 110° C.

Dry solid product dissolved in water at a temperature of approximately 75° C. and titrated to a Brom Thymol Blue endpoint showed a calculated purity of about 96.3%.

EXAMPLE VI

To 1,000 parts by weight of portion F from Example V was added 126 parts by weight of aqueous hydrofluoric acid solution (49% HF by weight). The F/Si mol ratio of the mixture was approximately 6.0. The mixture was heated to approximately 160° F.

To 1,126 parts by weight of the mixture was added 260 parts by weight of solid granular NaCl over about a two hour period, during which time the admixture was gently agitated.

The resulting precipitate was filtered out, washed with cold water and dried at approximately 110° C. Dry solid product dissolved in water at a temperature of approximately 75° C. and titrated to a Brom Thymol Blue endpoint with potassium hydroxide showed a calculated purity of approximately 99.9%.

Comparison of the products of Examples I thru VI is shown in Table I.

Table 1

| F/Si mol ratio of H₂SiF₆ used | Percent F yield based on fluoride | Percent K₂SiF₆ by titration procedure |
|---|---|---|
| K₂SiF₆: | | |
| 4.0 | 97.8 | 92.5 |
| 4.5 | 96.5 | 98.0 |
| 4.5 (NH₃) | | 98.5 |
| 5.5 | 100.5 | 99.2 |

| | | Percent Na₂SiF₆ by titration procedure |
|---|---|---|
| Na₂SiF₆: | | |
| 4.46 | .84 | 96.31 |
| 6.0 | 100 | 99.96 |

Having thus described our invention, what we claim is:

1. A process for producing substantially water insoluble silico fluoride salts of high purity from crude fluosilicic acid solution having a fluorine to silicon mol ratio less than about 4.4:1, which comprises adjusting the mol ratio of fluorine to silicon of the crude solution to a ratio between 4.5:1 and 6:1 by adding a basic ammonia reactant, separating insoluble silica-containing material from the F/Si adjusted solution and reacting the adjusted solution with a water soluble salt of a cation whose silico-fluoride salt is water insoluble.

2. A process for producing high purity potassium silico fluoride from crude fluosilicic acid solution having a fluorine to silicon mol ratio less than about 4.4:1, which comprises adding a basic reacting ammonium compound to the crude fluosilicic acid solution in an amount sufficient to precipitate silica and to adjust the mol ratio of fluorine to silicon of the crude solution to a ratio between 4.5:1 and 6:1, separating any insoluble silica-containing material from the F/Si adjusted solution and reacting the adjusted solution with a water soluble potassium compound whose anion will remain water soluble in the solution.

3. A process for producing high purity potassium silico fluoride from crude fluosilicic acid solution having a fluorine to silica mol ratio less than about 4.4:1, which comprises splitting the solution into a major and a minor portion, adding to the minor portion a basic reacting ammonium compound to adjust the pH of the solution to between about 4.5 and about 7.0, separating precipitated silica-containing solids from the resultant solution and mixing the F/Si adjusted solution with the initial separated and untreated major portion of solution and reacting the mixture with a water soluble potassium compound whose anion will remain water soluble in the solution.

4. A process for producing potassium silico fluoride from fluosilicic acid solution having a F/Si mol ratio of approximately 4.0 and a fluosilicic acid content of approximately 29% by weight, produced by absorbing in aqueous medium the gases evolved by the reaction of phosphate rock and sulfuric acid, which comprises splitting the solution into a 10% and a 90% of the feed portions, adding to the 10% of the feed approximately 28.6 parts by weight of ammonia per 100 parts by weight of solution, removing the precipitated silica-containing solids from solution, mixing the treated solution with the 90% of the untreated original feed, heating the mixture to approximately 160° F., adding to the mixture slowly and with agitation over a period of about two hours, 20.6 parts by weight of solid potassium chloride per 1,000 parts of solution, separating the solids from solution and drying the solids at a temperature of approximately 110° C.

References Cited in the file of this patent

UNITED STATES PATENTS

| | | |
|---|---|---|
| 1,235,552 | Chappell | Aug. 7, 1917 |
| 2,369,791 | Moore | Feb. 20, 1945 |
| 2,447,359 | Oakley | Aug. 17, 1948 |
| 2,556,064 | Caldwell et al. | June 5, 1951 |
| 2,728,634 | Miller | Dec. 27, 1955 |

FOREIGN PATENTS

| | | |
|---|---|---|
| 263,780 | Great Britain | Nov. 17, 1927 |